(12) United States Patent
Nipane et al.

(10) Patent No.: US 10,630,600 B2
(45) Date of Patent: Apr. 21, 2020

(54) ADAPTIVE NETWORK INPUT-OUTPUT CONTROL IN VIRTUAL ENVIRONMENTS

(71) Applicant: NICIRA, INC., Palo Alto, CA (US)

(72) Inventors: Nilesh Nipane, Mountain View, CA (US); Akshay Katrekar, Mountain View, CA (US); Jobin John, Palo Alto, CA (US); Maheedhar Nallapareddy, Palo Alto, CA (US)

(73) Assignee: NICIRA, INC., Palo Alto, CA (US)

(*) Notice: Subject to any disclaimer, the term of this patent is extended or adjusted under 35 U.S.C. 154(b) by 185 days.

(21) Appl. No.: 15/730,381

(22) Filed: Oct. 11, 2017

(65) Prior Publication Data
US 2019/0109799 A1    Apr. 11, 2019

(51) Int. Cl.
*G06F 15/16* (2006.01)
*H04L 12/911* (2013.01)
(Continued)

(52) U.S. Cl.
CPC .......... *H04L 47/783* (2013.01); *G06F 9/5077* (2013.01); *H04L 41/0893* (2013.01);
(Continued)

(58) Field of Classification Search
CPC ......... A61B 1/24; A61C 9/0053; A61C 9/006; A61C 9/0066; A61C 9/0073; A61C 9/008;
(Continued)

(56) References Cited

U.S. PATENT DOCUMENTS

| 6,046,980 A * | 4/2000 | Packer | H04L 41/0213 370/229 |
| 6,285,658 B1 * | 9/2001 | Packer | H04L 41/0213 370/229 |

(Continued)

OTHER PUBLICATIONS

Rekha et al., Dynamic network configuration and Virtual management protocol for open switch in cloud environmnt, IEEE International Advance Computing Conference (IACC), pp. 143-148. (Year: 2015).*

(Continued)

*Primary Examiner* — Moustafa M Meky
*Assistant Examiner* — Thorne E Waugh
(74) *Attorney, Agent, or Firm* — Hickman Palermo Becker Bingham LLP; Malgorzata A. Kulczycka

(57) ABSTRACT

An approach for an adaptive network input-output control for optimizing allocation of network transmission resources to data flows is provided. In an embodiment, a method comprises: determining, based on, at least in part, default data communications policy, one or more default settings for optimizing allocation of one or more network transmission resources to one or more data flows. The default settings are transmitted to a switch to cause the switch to implement the default settings with respect to the data flows. Upon detecting that stats information about network traffic has been received, one or more updated settings for reallocating at least one of the network transmission resources to at least one of the data flows are determined. The updated settings are transmitted to the switch to cause the switch to implement the updated settings with respect to the at least one of the data flows.

20 Claims, 6 Drawing Sheets

(51) Int. Cl.
*G06F 9/50* (2006.01)
*H04L 12/715* (2013.01)
*H04L 12/24* (2006.01)
*H04L 12/803* (2013.01)
*H04L 12/26* (2006.01)

(52) U.S. Cl.
CPC .......... H04L 41/0896 (2013.01); H04L 45/64 (2013.01); *H04L 41/5003* (2013.01); *H04L 43/026* (2013.01); *H04L 43/08* (2013.01); *H04L 47/125* (2013.01)

(58) Field of Classification Search
CPC .... B41J 2/175; G06F 9/5077; H04L 41/5003; H04L 45/64; H04L 47/125; H04L 47/783
See application file for complete search history.

(56) References Cited

U.S. PATENT DOCUMENTS

| | | | | |
|---|---|---|---|---|
| 7,133,365 | B2* | 11/2006 | Klinker | H04L 29/06 370/238 |
| 7,385,924 | B1* | 6/2008 | Riddle | H04L 41/5022 370/235 |
| 7,426,181 | B1* | 9/2008 | Feroz | H04L 47/10 370/230 |
| 7,496,661 | B1* | 2/2009 | Morford | H04L 41/5025 709/224 |
| 7,561,517 | B2* | 7/2009 | Klinker | H04L 29/06 370/229 |
| 7,668,966 | B2* | 2/2010 | Klinker | H04L 45/00 709/230 |
| 7,843,843 | B1* | 11/2010 | Papp, III | H04L 41/5009 370/252 |
| 7,962,647 | B2* | 6/2011 | Suri | H04L 45/00 709/224 |
| 9,781,037 | B2* | 10/2017 | Nellikar | H04L 45/745 |
| 2003/0033467 | A1* | 2/2003 | Yoshizawa | H04L 29/06 710/305 |
| 2003/0133443 | A1* | 7/2003 | Klinker | H04L 29/06 370/353 |
| 2015/0040121 | A1* | 2/2015 | Barabash | H04L 41/5003 718/1 |
| 2018/0316779 | A1* | 11/2018 | Dowlatkhah | H04L 45/64 |

OTHER PUBLICATIONS

Abbasi et al,. Journal of Telecommunications and Information Technology 4: 3-14. Warsaw: Instytut Lacznosci—Panstwowy Instytut Badawczy (National Institute of Telecommunications). (Year: 2016).*
Singh et al., A Survey on Software Defined Networking: Architecture for Next Generation Network, Journal of Network and Systems Management, Apr. 2017, pp. 321-374. (Year: 2017).*
VMware® Network I/O Control: Architecture, Performance and Best Practices Whitepaper, VMware https://www.vmware.com/techpapers/2010/network-io-control-10119.html.
Applied Regression Analysis, 3rd Edition, Norman R. Draper, Harry Smith, ISBN: 978-0-471-17082-2.
VMware: Phone Home Collector—Article Detail VMware {code}, 2 pages https://code.vmware.com/article-detail/-/asset_publisher/8n011DnrSCHt/content/phone-home-collector.
W. E. Leland, M. S. Taqqu, W. Willinger, and D. V. Wilson. On the self-similar nature of ethernet traffic (extended version). IEEE/ACM Trans. Netw., 2(1):Feb. 1-15, 1994. ISSN 1063-6692.
https://pubs.vmware.com/vsphere-4-esx-vcenter/index.jsp?topic=/com.vmware.vsphere.resourcemanagement.doc 41/getting started with resource management/c shares.html.

* cited by examiner

| Traffic Type | Shares | Shares Value | Reservation | Limit |
|---|---|---|---|---|
| Fault Tolerance (FT) Traffic | Normal | 50 | 0 Mbit/s | Unlimited |
| Management Traffic | Normal | 50 | 100 Mbit/s | Unlimited |
| NFS Traffic | Normal | 50 | 0 Mbit/s | 50 Mbit/s |
| Virtual Machine Traffic | High | 100 | 0 Mbit/s | Unlimited |
| iSCSI Traffic | Normal | 50 | 0 Mbit/s | Unlimited |
| Live Migration Traffic | Normal | 50 | 0 Mbit/s | 1,000 Mbit/s |
| vSAN Traffic | Normal | 50 | 0 Mbit/s | Unlimited |
| vSphere Data Protection Backup | Normal | 50 | 0 Mbit/s | Unlimited |
| vSphere Replication (VR) Traffic | Normal | 50 | 0 Mbit/s | Unlimited |

FIG. 3

```
If (throughputt1 > limit t1)                                    (1)
    If (link_saturated)                                         (2)
        T2= lowest priority traffic type                        (3)
        new_limit t2 = limit t2 – step-size                     (4)
        new_limit t1 = limit t1 + step-size                     (5)
    else
        new_limt t1 = limit t1 + priority*step_size             (6)
```

FIG. 6

ADAPTIVE NETWORK INPUT-OUTPUT CONTROL IN VIRTUAL ENVIRONMENTS

BACKGROUND

In a typical cloud environment, virtual switches facilitate communications between virtual machines. The virtual switches may be configured based on network policies, and configurations of the switches may be fine-tuned to optimize the network throughput.

Fine-tuning configurations of the switches is often difficult as the switches may have different characteristics, different capacities, and different types of ports. Thus, if a cloud cluster includes hundreds of different switches and hundreds of different ports, fine-tuning the switches in the cluster to optimize the network throughput may be quite difficult.

The difficulty in fine-tuning the switches is often amplified by the fact that virtual environments are inherently dynamic. For example, the virtual environment may be dynamically reconfigured as some virtual machines are evacuated from virtual spaces, some virtual storage disks are moved from one virtual location to another, some files are transferred from one location to another, or some data is transferred from one virtual machine to another. Since the reconfigurations are dynamic and unpredictable, the fine-tuning of the switches in the cluster needs to be as dynamic as possible.

SUMMARY

Techniques are described herein for dynamically and adaptively controlling and managing resource allocation to different types of traffic communicated within virtual environments. The techniques include adjusting settings for virtual switches in an adaptive manner. The traffic is controlled and managed dynamically because the settings for the virtual switches are adjusted on a fly as status of virtual ports changes and as network events occur within a host computer. The traffic is controlled and managed adaptively because the settings for the virtual switches are continuously adjusted to adapt the network virtual environment to deliver the best possible throughput. The process may be repeated until throughput values computed for different types of traffic reach steady states and remain within desired ranges. The adjustments take into account dynamic reconfigurations of the virtual environment and provide improvements in terms of the overall network throughput.

BRIEF DESCRIPTION OF THE DRAWINGS

In the drawings:

FIG. 3 depicts example initial settings according to an example network input-output control policy;

FIG. 6 depicts an example algorithm for determining a new bandwidth limit for a particular traffic of a particular type.

DETAILED DESCRIPTION

In the following description, for the purposes of explanation, numerous specific details are set forth in order to provide a thorough understanding of the presently described method. It will be apparent, however, that the present approach may be practiced without these specific details. In other instances, well-known structures and devices are shown in a block diagram form to avoid unnecessarily obscuring the present approach.

Adaptive Network Input-Output Control System

Figure 1:
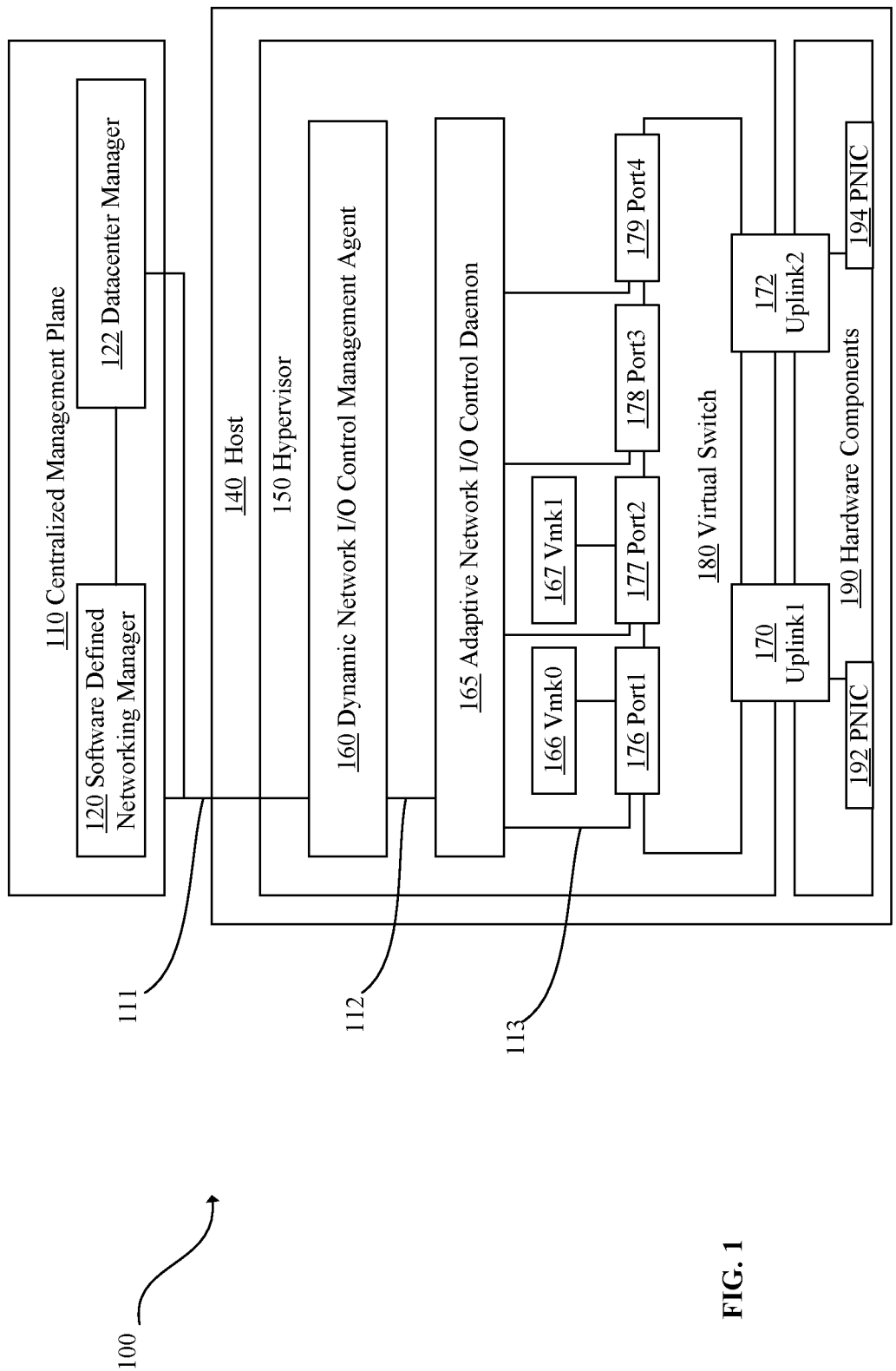
FIG. 1 is a block diagram depicting an example system architecture for adaptive network input-output control in a virtual cluster.

FIG. 1 is a block diagram depicting an example system architecture for adaptive network input-output control (NIOC) in a virtual cluster 100. In the depicted example, virtual cluster 100 includes a centralized management plane 110, and a host 140. Host 140 may include a hypervisor 150, and hardware components 190. Hypervisor 150 may include a virtual switch 180. Uplinks 170, 172 are attached to a virtual switch 180, and connect to physical Network Interface cards (pNICs) 192, 194.

Centralized management plane 110 may include a software defined networking manager and a datacenter manager 122.

Software defined networking manager 120 may be configured to distribute NIOC policies to one or more dynamic NIOC agents 160, and receive NIOC utilization information from agents 160. The NIOC policies and NIOC utilization information may be communicated via one or more communications links 111.

NIOC policies may include rules that govern data traffic. The rules may be designed to for example, ensure that excess traffic from a particular traffic type does not affect other types of traffic. The rules may also ensure that performing a backup of data of one virtual machine does not affect the network traffic communicated to and from the virtual machine.

Datacenter manager 122 may be configured to collect information about events, actions and tasks occurring or executed in a datacenter, and communicate the collected information to dynamic NIOC agents 160.

Hypervisor 150 may include components that implement an adaptive NIOC approach in virtual environment 100. For example, hypervisor 150 may include one or more dynamic NIOC management agents 160 and one or more adaptive NIOC daemons 165, and communicate with them to delegate to them the NIOC duties.

Hypervisor 150 may be implemented as a software layer or a component that supports execution of multiple virtualized computing instances of virtual machines (VMs).

Virtual switch 180 may be implemented as a kernel component of hypervisor 150, or as an entity that is separate from hypervisor 150 but that communicates with hypervisor 150, virtual switch 180 may be configured to monitor and manage data traffic that is communicated to and from hypervisor 150.

Virtual switch 180 may be configured to provide the NIOC functionality. For example, virtual switch 180 may be configured to receive NIOC-based instructions for adjusting settings on ports 176-179. It may also be configured to apply the received instructions to the ports and subsequently manage the traffic transmitted via the ports. This may also include controlling the data provided to uplinks 170-171, and other components of hypervisor 150. Virtual switch 180 may receive the NIOC-based instructions directly from adaptive NIOC daemon 165 and/or indirectly from dynamic NIOC agent 160.

Implementations of virtual switch 180 may vary and may depend on a type of product in which the switch is deployed as a virtualization medium. For example, virtual switch 180 may be implemented as part of hypervisor 150, as it is depicted in FIG. 1, and as in the vSphere® and KVM® lines of products. Alternatively, although not depicted in FIG. 1, a virtual switch may be implemented as a hardware component, or as part of a user space, or as part of a space that is dedicated to a virtual machine and that is under the control of the virtual machine. Examples of such implementations include the HyperV® and Xen® lines of products.

In an embodiment, virtual switch 180 is implemented as a Distributed Virtual Switch (DVS) that is configured with software-based implementations of NIOC capabilities.

Virtual switch 180 may be configured to interface with virtual machines (VM).

Dynamic NIOC management agent 160 may be executed on hypervisor 150, and may be configured to receive NIOC policy information for different types of traffic from software defined networking manager 120. Agent 160 may also be configured to receive stats information about virtual ports, such as ports 176, 177, 178, 179, and stats information about virtual kernel adapters, such as Vmk0 166, and Vmk1 167. Agent 160 may further be configured to receive NIOC utilization data, generate NIOC settings, and transmit the NIOC settings to be implemented on virtual switch 180.

In an embodiment, dynamic NIOC agent 160 generates NIOC settings based on received NIOC polices, priorities, shares, and bandwidth limits assigned to different types of traffic. Agent 160 may for example, assign initial priorities, counts of shares, and limits to different traffic types, and then modify the assignments if it determines that the network throughput can be improved.

Adaptive NIOC daemon 165 may be executed on hypervisor 150, may be configured to receive instructions from dynamic NIOC agent 160. Daemon 165 may communicate the instructions to virtual switch 180 to cause the virtual switch to adjust the settings on ports 176-179. For example, if a particular host is operating in a maintenance mode, and dynamic NIOC agent 160 determines new settings for adjusting the settings on a live migration port to speed up execution of the maintenance mode operation, then daemon 165 may receive the new settings and transmit them to virtual switch 180 to cause the virtual switch to implement the settings.

Adaptive NIOC daemon 165 may be configured to monitor data traffic transmitted via ports 176-179 and virtual kernel adapters Vmk0 166, Vmk1 167. Daemon 165 may also be configured to collect stats information about the ports, the adapters, and different types of traffic, and communicate the stats information to dynamic NIOC agent 160. Based on the received stats information, agent 160 may generate settings for adjusting for example, allocation of the network bandwidth to different types of traffic, and communicate the settings to daemon 165.

Virtual machines may be realized as complete computational environments, containing virtual equivalents of hardware and software components of the physical computing systems. Virtual machines may be instantiated as virtualized computing instances. The instances may be equipped with their own resources, may be assigned their own workloads, and may be configured to perform their own tasks associated with the workloads. Virtual resources allocated to the virtual machines may include virtual CPUs, virtual memory, virtual disks, virtual network interface controllers and the like. Virtual machines may be configured to execute guest operating systems and guest applications.

A virtualized computing instance may be realized as a hardware virtualization and/or a software virtualization. As a hardware virtualization, it may represent for example, an addressable virtual machine. As a software virtualization, it may be used to provide for example, an isolated user space instance. Virtualized computing instances may include containers running on a top of the host operating system, virtual private servers, client computers, and hybrid combinations of thereof.

Hardware components 190 may include hardware processors, memory units, data storage units, and physical network interfaces, not all of which are depicted in FIG. 1. For example, hardware components 190 may also include physical network interface controllers (PNICs, not depicted in FIG. 1) that may provide connectivity to routers and switches of one or more physical networks.

Network Input-Output Control Policies

In the context of virtual clusters, NIOC policies define how input-output traffic is managed within the clusters. The NIOC polices are used to define for example, the ways for monitoring, controlling and managing the network bandwidth for different types of data traffic. They may define the ways for partitioning the physical network bandwidth, assigning the bandwidth partitions to different types of traffic flows, and repartitioning the bandwidth assignments in response to detecting new events, actions, and/or tasks.

NIOC policies may be used to define various ways for managing control settings across multiple switches and multiple hypervisors. They may also be used to define the ways for modifying the settings as the traffic patterns and application requirements change. For example, the NIOC policies may define the ways for adjusting the control settings on communications ports to fully utilize available network bandwidth. The polices may specify for instance, how to allocate the bandwidth to different traffic flows without halting any of the flows and without preventing any of the flows from accessing the requested resources. The policies may be adjusted dynamically, and so may be the control settings derived based on the dynamically adjusted polices.

At a high level of abstraction, NIOC policies may be viewed as equivalents of the Quality of Service (QoS) policies. However, in sharp contrast to typical QoS policies, NIOC polices are not implemented at the packet or segment level.

Network Input-Output Control Settings

NIOC settings may be adaptively and dynamically adjusted to enforce the traffic isolation and prioritization as the traffic is communicated within virtual clusters. Generally, the NIOC settings pertain to allocating network transmission resources, such as network bandwidth, and the like. The NIOC settings may be adjusted to for example, enforce the optimal bandwidth utilization across all the ports and kernel adapters. The NIOC settings may also be adjusted to facilitate reservations of the bandwidth to various types of data traffic.

Bandwidth allocation may be performed based on priorities and shares assigned to different types of data traffic, events, tasks, and actions.

A priority assigned to for example, a particular traffic flow is a measure of importance of the particular traffic flow in reference to other traffic flows. A traffic flow that has assigned the highest priority is considered the most important flow among the flows. The priority assigned to a traffic flow may be increased and/or decreased without modifying the priorities assigned to other flows.

A count of shares assigned to for example, a traffic flow is a measure of tokens that have been granted to the traffic flow. The count of shares granted to a traffic flow may be increased and/or decreased. However, the modifications of the count of shares granted to one traffic flow impact counts of shares granted to other traffic flows. If two traffic types start with 10 shares each, then they are treated equally. If 10 shares are added to traffic type 1, then traffic type 1 becomes two times more important than traffic type 2. Shares of traffic type 2 still remain 10. But now the ratio of type 1 to type 2 is 20:10, which is 2:1.

Managing NIOC settings may involve managing and modifying assignments of bandwidth limits, priorities and/or shares to different types of traffic in order to improve the network throughput. Adjusting the NIOC settings may include for example, increasing or decreasing bandwidth limits allocated to different types of traffic, adjusting the manner in which the shares are allocated to the traffic, and/or adjusting the manner in which the priorities are assigned to the traffic. The NIOC settings may be determined and adjusted by dynamic NIOC agent 160, and provided by dynamic NIOC agent 160 to adaptive NIOC daemon 165, or directly to virtual switch 180.

Initialization of an Adaptive Network Input-Output Control System

Figure 2:
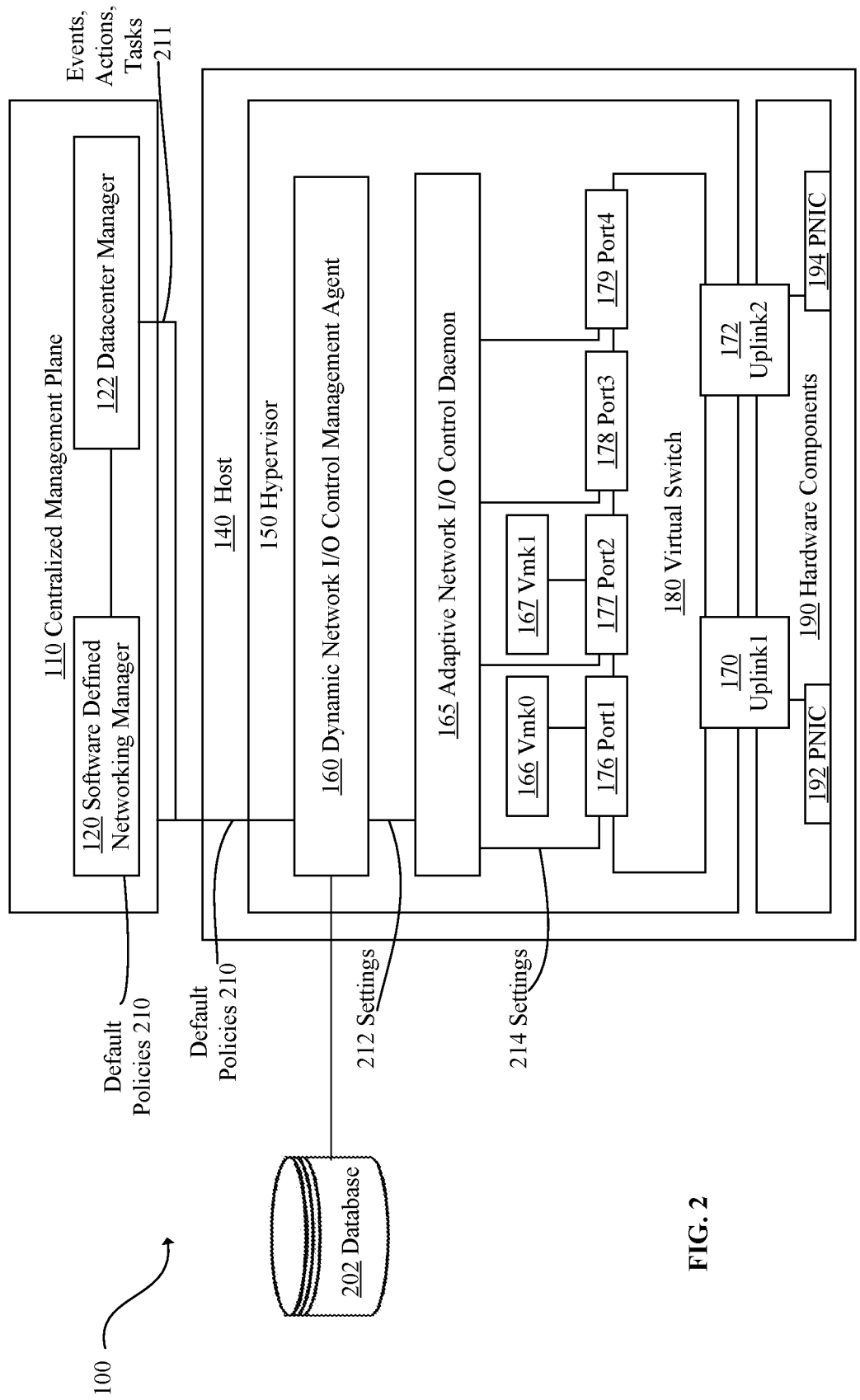
FIG. 2 depicts an example initialization process for an example system implementing an adaptive network input-output control in a virtual cluster.

FIG. 2 depicts an example initialization process for an example system implementing an adaptive NIOC in a virtual cluster 100. Elements 110, 120, 122, 150, 160, 165, 170-172, 176-179, 180, 190, 192 and 194 depicted in FIG. 2 correspond to the respective elements described in FIG. 1. In an embodiment, virtual cluster 100 may include some of the elements depicted in FIG. 2, and/or may include additional elements not depicted in FIG. 2.

An adaptive NIOC may be initialized by providing default NIOC policies 210 to software defined networking manager 120, and providing default NIOC polices 210 to dynamic NIOC agent 160. The initialization may also include providing information about events, actions, and tasks 211 detected or initiated by datacenter manager 122. Examples of events include evacuating virtual machines from a hypervisor, moving a virtual storage disk, transferring (NFS) files between devices, and performing data backups. Examples of actions include an action mode operation, a data protection backup at a certain time period, and a storage operation. Each action may include a set of tasks that are to be performed to complete the action.

Default NIOC policies 210 may be automatically downloaded to software defined networking manager 120, may be loaded from a local configuration file, may be provided manually via any type of user interface, including a graphical user interface, or may be otherwise provided to software defined networking manager 120.

Default NIOC policies 210 may include various types of information for managing and controlling data traffic in virtual environment 100. Policies 210 may include rules, limits, default settings, and default assignments of priorities, shares and limits to different types of traffic. For example, policies 210 may specify initial assignments of priorities to the different types of traffic, initial assignments of shares to the different types of traffic, default reservations of network transmission resources to the different types of traffic, default assignments of bandwidth limits to the different types of traffic, and the like. The different types of traffic may include live migration traffic, VM traffic, VDP traffic, NFS traffic, and the like.

Policies 210 may also specify minimum bandwidth reservations, maximum bandwidth reservations, default bandwidth reservations, default priorities, and default shares counts.

Priorities specified in policies 210 may reflect the importance of different types of traffic. For example, more critical traffic may have assigned a higher priority value, and less critical traffic may have assigned a lower priority value. For instance, if a relatively high priority is assigned to live migration traffic and a relatively low priority is assigned to VM traffic, and the live migration traffic and the VM traffic are contending for the same bandwidth, then, at least initially, policy 210 would allow increasing the priority assigned to the live migration traffic, and that would result in increasing the bandwidth dedicated to the live migration traffic.

According to another example, default policies 210 may specify that if an action called a maintenance mode operation is detected, then the live migration traffic is to be prioritized. When a host is put into a maintenance mode, virtual machines hosted on the host migrate to other hosts. This is orchestrated by datacenter manager 122. The host might not know that it was put into maintenance mode. However, manager 122 may identify destination hosts for the VMs and simply start migrating VMs off the host. As part of placing the host into maintenance mode, in addition to migrating VMs off the host, manager 122 may instruct hypervisor 150 to prioritize live migration traffic. This allows reducing the time during which all VMs are moved off the host.

Default policies 210 may also specify that if an action called a data protection backup (performed daily at a certain time) is detected, then the VDP traffic is to be prioritized. Default policies 210 may further specify that if an action called a storage operation is detected, then the NFS traffic is to be prioritized.

Examples of initial settings included in default NIOC policies 210 are depicted in FIG. 3.

Referring back to FIG. 2, upon receiving default NIOC policies 210, software defined networking manager 120 may transmit default NIOC policies 210 to dynamic NIOC management agent 160. Default policies 210 may be communicated from software defined networking manager 120 to agent 160 by either pushing default policies 210 automatically to agent 160, or upon a request received from agent 160 by software defined networking manager 120.

Upon receiving default NIOC policies 210, agent 160 may store default polices 210 in database 202 implemented locally on host 140. Agent 160 may also parse default policies 210, and generate settings 212 based on the parsed information.

Settings 212 may be represented in the format that adaptive NIOC daemon 165 may parse and implement on virtual switch 180. Agent 160 may communicate settings 212 to adaptive NIOC daemon 165. Upon receiving settings 212, daemon 165 may convert settings 212 into actual settings 214, which in turn may be implemented on virtual switch 180.

Example Initial NIOC Settings

FIG. 3 depicts example initial settings according to an example NIOC policy. The examples are provided to merely describe simple settings for a few example data flows, and should not be considered as limiting in any way. The settings depicted in FIG. 3 are shown in a form of a table; however, the settings may also be organized using data pointers, arrays, vectors, and the like.

FIG. 3 depicts a table having columns 310, 320, 330, 340 and 350. Column 310 is used to depict examples of different data flows. The data flows are organized by the types of data traffic. Examples of different data flows include fault tolerance (FT) traffic, management traffic, NFS traffic, iSCCI traffic, live migration traffic, vSAN traffic, vSphere data protection backup traffic, and vSphere replication (VR) traffic. Other types of data flows may also be included.

Column 320 is used to provide indications of counts of shares that have been granted to different types of traffic. The indicators may be encoded as high, normal and low. If a particular traffic type was granted a relatively large count of shares, then the corresponding indicator may be high. For example, virtual machine traffic 375 has a high count of shares (100), and therefore the corresponding indicator is high. If a particular traffic type was granted a relatively small count of shares, then the corresponding indicator may be low.

Column 330 is used to depict shares values (or counts) that are associated with different traffic types. For example, a shares count associated with NFS traffic 370 is 50. Other types of traffic may have the same or other shares counts.

Column 340 is used to depict bandwidth reservation information associated with the different traffic types. For example, a bandwidth reservation initially made for NFS data flow 370 is 0 Mbits/sec. Other data flows may have the same or other bandwidth reservations.

Column 350 is used to depict bandwidth reservation limits associated with different traffic types. For example, a bandwidth reservation limit initially set for NFS data flow 370 is 500 Mbits/sec. Depending on characteristics of the particular data traffic, the initially assigned limits may be increased or decreased in the later time.

Adaptive Network Input-Output Control

In an embodiment, network traffic transmitted via one or more virtual switches is adaptively controlled by one or more dynamic NIOC agents 160 and one or more adaptive NIOC daemons 165. Agents 160 and daemons 165 are executed on hypervisor 150 and cooperate with each other to optimize throughput of the network traffic transmitted via virtual switch 180.

Figure 4:
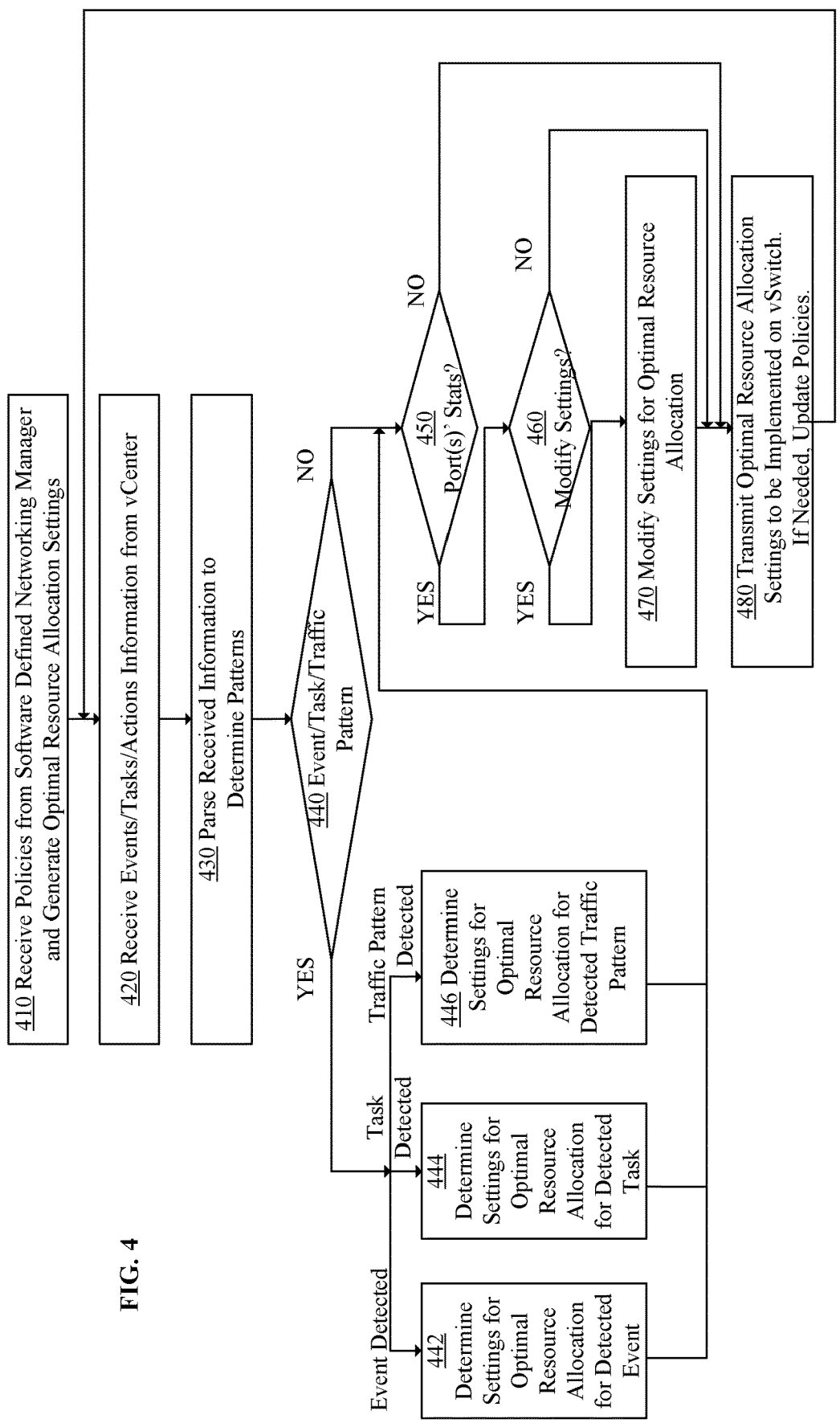
FIG. 4 depicts an example process for an adaptive network input-output control in a virtual cluster.

FIG. 4 depicts an example process for an adaptive NIOC in a virtual cluster. In step 410, dynamic NIOC agent 160 is executed to establish a communications connection with software defined networking manager 120 to obtain NIOC policies for the cluster. The NIOC policies may be default NIOC policies or customized NIOC policies.

Also in this step, agent 160 generates optimal resource allocation settings for a virtual switch. The settings may be generated based on the received NIOC default policies. The settings may be generated to optimize various parameters of the data transmission resources, including amounts bandwidth allocated to different types of traffic.

In step 420, dynamic NIOC agent 160 establishes a communications connection with datacenter manager 122 to receive information about events, tasks and actions detected by datacenter manager 122.

In step 430, dynamic NIOC agent 160 parses the received information to determine whether the information is indicative of events patterns, tasks patterns, and/or traffic patterns.

In step 440, dynamic NIOC agent 160 performs a test on the parsed information to determine whether any events pattern, tasks pattern, or traffic pattern has been indicated in the received information. If a pattern has been indicated, then one or more steps 442, 444 and/or 446 are performed. Otherwise step 450 is performed.

If a particular event is detected, then in step 442, dynamic NIOC agent 160 determines, or adjusts, control settings to cause an optimal resource allocation of network transmission resources to accommodate the detected event. Determining/adjusting the control settings for the optimal resource allocation of the network resources may include allocating additional bandwidth to a particular traffic type, modifying a priority assigned to a particular traffic type, modifying a count of shares assigned to a particular traffic type, and so forth.

If a particular task is detected, then in step 444, dynamic NIOC agent 160 determines, or adjusts, control settings for an optimal resource allocation of network agent resources to accommodate the detected task. This may include adjusting bandwidth, priorities, shares, and so forth, for a particular traffic type.

If a particular traffic pattern is detected, then in step 446, dynamic NIOC agent 160 determines, or adjusts, control settings for an optimal resource allocation of network transmission resources to accommodate the detected traffic pattern. This may include adjusting bandwidth, priorities, shares, and so forth, for a particular traffic type.

In step 450, dynamic NIOC agent 160 determines whether any stats information about ports and/or kernel adapters implemented on virtual switch 180 has been provided to agent 160. The stats information may be provided by for example, adaptive NIOC daemon 165.

If stats information about the ports has been received by dynamic NIOC agent 160, then step 460 is performed. Otherwise, step 480 is performed.

In step 460, dynamic NIOC agent 160 determines whether the received stats information about the ports implemented on virtual switch 180 may have some impact on the optimal resource allocation. If it may have, then step 470 is performed. Otherwise, step 480 is performed.

In step 470, dynamic NIOC agent 160 modifies the settings for the optimal resource allocation. For example, if the settings for the optimal resource allocation indicated that additional bandwidth is to be allocated to a particular data traffic to accommodate a particular event, but the stats information indicates that the port that transmits that traffic associated with the particular event has already reached its capacity, then the settings for the optimal resources allocation may have to be adjusted accordingly.

In step 480, dynamic NIOC agent 160 transmits the optimal resource allocation settings to virtual switch 180 to cause the switch to implement the settings. This step may be performed each time event/task/action pattern is detected, and/or port stats information is received. For example, dynamic NIOC agent 160 may monitor detected events, actions and tasks, and determine whether the occurrence of the detected events/actions/tasks necessitates modifications or adjustments of settings 212. For instance, as a particular action is triggered, dynamic agent 160 may retrieve a particular policy from database 202, use the particular policy to generate updated settings 212 for optimal resource allocation, and communicate updated settings 212 to adaptive NIOC daemon 165, which in turn may generate updated settings 214 and transmit updated settings 214 to virtual switch 180 to cause the switch to implement the updated settings.

According to another example, as dynamic NIOC agent 160 receives port stats reports 222, agent 160 may modify settings 212 stored in database 202, generate updated settings 212 for optimal resource allocation, and communicate updated settings 212 to adaptive NIOC daemon 165, which in turn may generate updated settings 214 and transmit updated settings 214 to virtual switch 180.

If there is a need to update NIOC policies for the particular switch, then in step 480, dynamic NIOC agent 160 may update the policies. For example, if the settings for optimal resource allocation have been modified and are different than the initial settings, then agent 160 may modify the NIOC policies, and store the modified policies in database 202.

Limit-Based Adaptive Network Input-Output Control

In the context of adaptive NIOC, the term "limit" is defined as the maximum bandwidth that may be allocated to a particular type of data traffic that is transmitted via a port implemented on a virtual switch. Initially, each traffic type may be assigned a default bandwidth limit. The assignments may be based on for example, priorities assigned to the traffic types. Hence, the limits are usually high for high priority traffic, and low for low priority traffic. Usually, a default maximum bandwidth limit is not lower than a minimum bandwidth value that is initially set in a default NIOC policy.

Bandwidth limits may be, however, adjusted. The adjustments may be triggered by for example, changes in stats of ports implemented in virtual switch 180. In a limit-based adaptive NIOC approach, dynamic NIOC agent 160 continuously monitors stats of the ports and uses the stats information to determine whether the bandwidth limits need to be adjusted.

Figure 5:
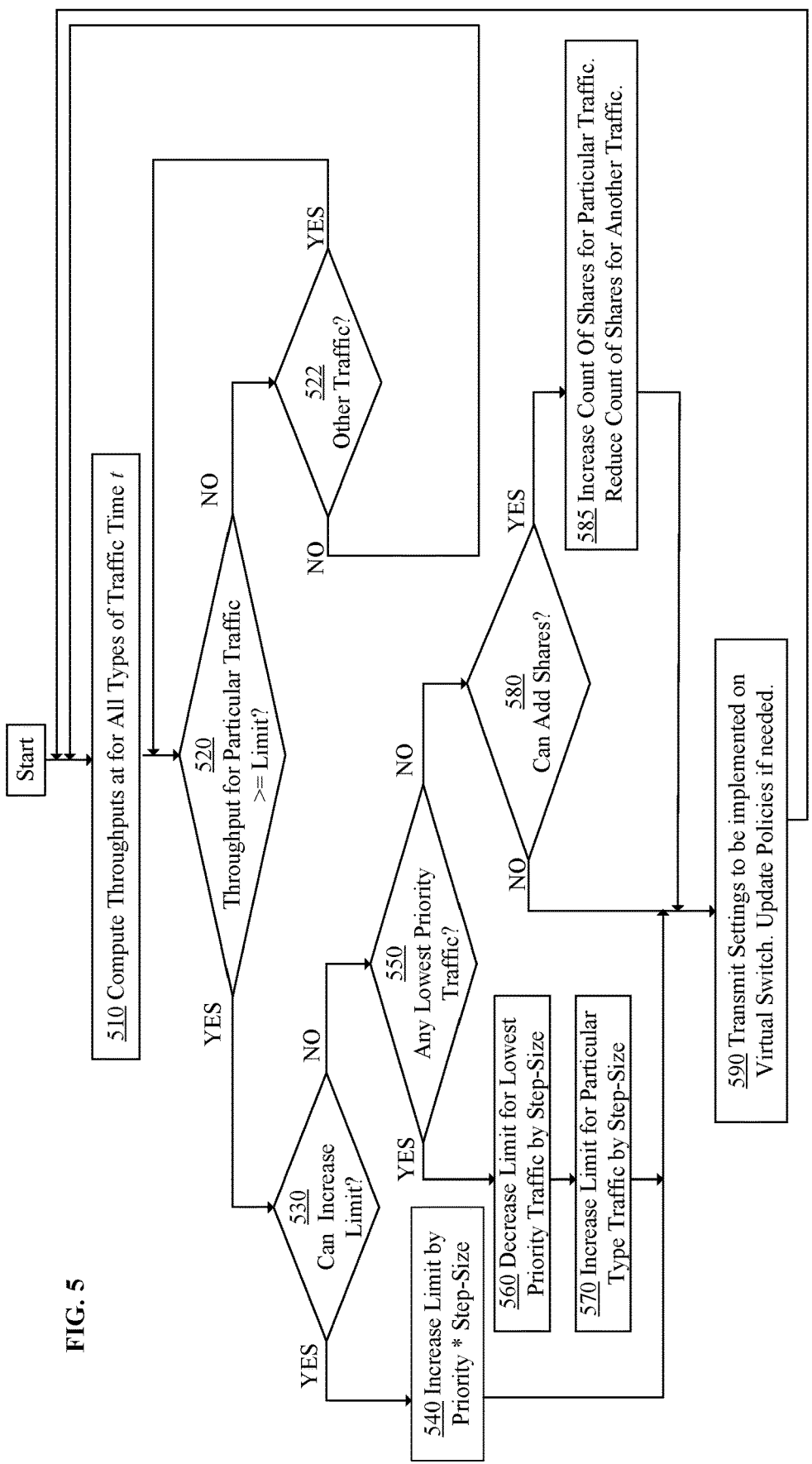
FIG. 5 depicts an example process for an adaptive network input-output control in a virtual cluster.

FIG. 5 depicts an example process for an adaptive NIOC in a virtual cluster. In step 510, dynamic NIOC agent 160 computes throughput values for all types of traffic at time t. For example, agent 160 may periodically (for example, every 2 seconds) request stats information about the ports, and based on the collected stats information, compute a throughput measure as a function of time. A throughput measure at time t may be computed using for example, the following expression:

$$\text{Throughput}(t) = (\text{TransmitBytes}(t) - \text{TransmitBytes}(t-1))/x \quad (1)$$

In expression (1), Throughput(t) denotes a throughput measure determined for a particular port at time t, TransmitBytes(t) denotes a count of bytes transmitted via the port within the time period $\{0.0, t\}$, TransmitBytes(t−1) denotes a count of bytes transmitted via the port within the time period $\{0.0, t-1\}$, and x denotes a time difference between t and (t−1).

In step 520, dynamic NIOC agent 160 performs a test to determine whether a throughput value for a particular traffic exceeds, or is equal to, the bandwidth limit assigned to that traffic. If the throughput value for the particular traffic exceeds, or is equal to, the assigned bandwidth limit, then step 530 is performed. Otherwise, step 522 is performed.

In step 530, dynamic NIOC agent 160 determines whether the bandwidth limit assigned to the particular traffic can be increased. If the bandwidth limit assigned to the particular traffic can be increased, then step 540 is performed. Otherwise, step 550 is performed.

The determination whether a bandwidth limit may be increased may include determining whether certain conditions have been met, and if they have, determining which NIOC limit values can be adjusted. The conditions and trigger points are usually determined based on the mode of operation in which the system operates. Examples of different modes of operation include a reactive mode and a predictive mode.

In a reactive mode, the system computes throughput values for all ports implemented on a virtual switch using expression (1), and monitors the computed throughput values at each time interval. If for a given port and a given traffic type, the throughput value reaches a particular limit and remains at the particular limit for some period of time (such as for several consecutive time intervals), then the system may initiate a corrective action on the limit assigned to the given traffic transmitted via the given port. For example, the system may adjust the bandwidth limit assigned to the given traffic.

In a predictive mode, the system tries to predict the traffic usage for different types of data traffic. If the system determines that the predicted traffic may potentially reach a particular bandwidth limit, then the system may initiate a corrective action on the particular limit before the bandwidth limit is actually reached.

To generate a prediction, the system may use historical throughput data to extrapolate future throughput data. For example, the system may use the historical throughout values computed using expression (1) to generate a time series graph for the throughputs. Then, based on the time series graph, the system may determine the throughput's trend, and based on the throughput's trend, extrapolate the throughput values for the future times. The extrapolating may be viewed as constructing prediction limits for the future throughputs.

A more precise algorithm may take into account historical throughput data collected during a long-time duration as historical throughput data collected during a long-time duration may be more consistent than historical throughput data collected during a short-time duration.

A trend may be determined using various approaches, including a linear regression modeling. Based on the linear regression analysis of the past x observations, a fitted model may be developed. The fitted model may be used to predict throughputs at the future times. If the predicted throughput value is greater than the current bandwidth limits, then the system may initiate a corrective action and adjust the limit.

In a predictive mode, throughput information may be reported via a phone home system, or a similar system to fine tune the prediction graph. The predictive mode may be more applicable to predictable and consistent traffic patterns, and less applicable to unpredictable and inconsistent (burst) traffic patterns.

Corrective Actions for Limit-Based Adaptive Network Input-Output Control

If the usage of a particular traffic type reaches a particular bandwidth limit or is predicted to reach the particular bandwidth limit, then the system may increase the limit for that traffic type. The amount of increase may depend on the priority assigned to the particular traffic type and a step-size selected for determining the increment amount.

FIG. 6 depicts an example algorithm 610 for determining a new bandwidth limit for a particular traffic T1 of a particular type t1.

In the algorithm depicted in FIG. 6, throughputt1 denotes a throughput value computed or predicted for traffic T1; limit t1 denotes a bandwidth limit assigned to traffic T1; T2 denotes the lowest priority traffic; new_limit t2 denotes a new bandwidth limit for traffic T2 and is computed using expression (4); new_limit t1 denotes a new bandwidth limit for traffic T1 and is computed using expression (5); alternatively, new limit t1 may be computed using expression (6).

Referring again to FIG. 5, in step 540, dynamic NIOC agent 160 increases the bandwidth limit assigned to the particular traffic. The increment amount may be computed as for example, a product of a step-size and a priority value assigned to the particular traffic. Hence, if for a 1 Gbps link a step-size is 50 Mbps, and a priority value assigned to the particular traffic is 5, then the increment amount is 50 Mbps*5=250 Mbps. The reason for using the priority value in computing the increment amount is to ensure that when bandwidth limits for multiple traffic types are to be increased, the rate of increase for the critical traffic takes precedence over the rates of increase for non-critical traffic.

In situations when a communications link is saturated and the bandwidth limit cannot be increased for a particular type traffic, the system may try to determine whether a bandwidth limit for the lowest priority traffic may be decreased. If there is the lowest priority traffic, then the system decreases the bandwidth limit for the lowest priority traffic and increases a bandwidth limit for the particular type traffic.

In step 550, dynamic NIOC agent 160 determines whether there is the lowest priority traffic for which bandwidth limit may be increased. If there is such lowest priority traffic, then dynamic NIOC agent 160 performs step 560. Otherwise, step 580 is performed.

In step 560, dynamic NIOC agent 160 decreases a bandwidth limit for the lowest priority traffic. For example, the system may reduce the bandwidth limit assigned to the lowest priority traffic type by a step-size (i.e., by 50 Mbps in case of a 1 Gbps link), and if possible, increase the bandwidth limit for the particular priority traffic type by the computed amount.

In step 570, dynamic NIOC agent 160 increases the bandwidth limit assigned to the particular traffic by the step-size.

However, if a bandwidth limit for the lowest priority traffic cannot be increased, then the system may try to reduce bandwidth limits for other traffic types. A bandwidth limit cannot be reduced if the bandwidth limit is already lower than the minimum bandwidth value set in the NIOC policy. Hence, when the traffic usage falls below the bandwidth limit value, the system may start reducing the limits of other types of traffic until a desired bandwidth amount for the particular data traffic becomes available.

If, however, there is no lower priority traffic for which the assigned bandwidth priority can be decreased, then dynamic NIOC agent 160 performs step 580, which is described below.

Policy-Based Adaptive Network Input-Output Control

In an embodiment, dynamic NIOC agent 160 determines a count of shares that are assigned to the particular traffic. Shares may be viewed as tokens that can be initially granted to the particular traffic, and then increased or decreased based on the bandwidth demands put by the particular traffic. The shares may also be viewed as a measure for prioritizing the bandwidth allocation for different types of traffic.

Shares are often used to determine NIOC settings when a communications link is completely saturated. By increasing the count of shares assigned to a particular traffic, dynamic NIOC agent 160 allows giving a preferential treatment to the particular traffic in a physical communications pipeline.

Initially, all traffic types have assigned default counts of shares. The default counts may be determined based on the priorities assigned to the corresponding traffic types. A count of shares for a particular traffic type may be increased when a certain action is triggered, or when the particular traffic requires more bandwidth but a bandwidth limit assigned to the particular traffic cannot be increased.

In step 580, dynamic NIOC agent 160 determines whether a particular count of shares assigned to a particular traffic may be increased. This may include determining whether a certain count of shares may be taken away from another type of traffic and whether the certain count of shares may be added to the particular count of shares assigned to the particular traffic. If the shares for the particular traffic may be increased, then step 585 is performed. Otherwise, step 590 is performed.

In step 585, dynamic NIOC agent 160 increases the count of shares assigned to the particular traffic and decreases the count of shares assigned to another traffic. The increase may be determined in various ways. For example, agent 160 may double the count of shares that are already assigned to the particular traffic, and decrease the count of shares assigned to another traffic by the corresponding amount. Increasing the count of shares assigned to the particular traffic will most likely increase the throughput of the particular traffic type.

In step 590, dynamic NIOC agent 160 transmits settings to adaptive NIOC daemon 165, or directly to virtual switch 180. Implementing of the settings may cause adjusting the bandwidth allocation for the particular traffic, and/or adjusting bandwidth limits for other traffic.

Also in step 590, dynamic NIOC agent 160 determines whether the NIOC policies are to be updated, and if so, updates the NIOC policies. The NIOC policies may be updated when for example, the bandwidth limits assigned to different types of traffic have been modified, when the share counts assigned to different types of traffic have been changed, and so forth.

Dynamic NIOC agent 160 may continue monitoring throughput for a particular traffic in step 510, and throughputs for other traffic in step 522. The throughput for the particular traffic may be compared with a running average of previous throughput observations to determine whether the shares should be increased again or not. If the current throughput reaches the limit based on the current share values or exceeds the running average, then agent 160 may increase the shares again.

This process may be repeated until throughput values computed for different types of traffic reach a steady state and remain below maximum values during a certain time period. As the throughput values remain below the running average, dynamic NIOC agent 160 may start reducing a share count assigned to a particular traffic until a new initial default is reached.

Benefits of Example Embodiments

In an embodiment, the approach implemented on a host computer allows adjusting bandwidth limits for different types of traffic based on stats information of ports implemented on the host. The approach is particularly effective for optimizing throughput for transferring large files between virtual machines because it allows speeding up the transfer as NIOC bandwidth settings are modified on-the-fly.

When the approach implements a reactive mode for increasing bandwidth limit values, the approach allows adjusting bandwidth limits in such a way that the increase in the file-transfer-speed is almost linear. This is rarely achievable using other approaches.

In an embodiment, the approach allows decreasing the estimated total file transfer time as bandwidth limit values are increased. For example, the approach allows decreasing the total time for transferring the file by at least three times in comparison with the total time for transferring the file using some other approaches.

Extension and Alternatives

Dynamic NIOC approach may be expanded by implementing the approach to environments that mimic real-world datacenters. The throughput observations obtained in such environments may be used to improve the ways for controlling and managing access to the datacenters having traffic usage rather unpredictable.

Dynamic NIOC approach may be enhanced by implementing various algorithms for predicting throughputs. The approach may also be enhanced by providing rules for handling different vSphere events, and for deriving NIOC settings for different events. For example, the approach may be enhanced by incorporating an analysis of events that indicate a certain storage operation or a fault-tolerance operation, and by implementing decision processes that may be used to determine settings for adjusting the storage or fault tolerance (FT) traffic types accordingly.

Implementation Mechanisms

The present approach may be implemented using a computing system comprising one or more processors and memory. The one or more processors and memory may be provided by one or more hardware machines. A hardware machine includes a communications bus or other communication mechanisms for addressing main memory and for transferring data between and among the various components of hardware machine. The hardware machine also includes one or more processors coupled with the bus for processing information. The processor may be a microprocessor, a system on a chip (SoC), or other type of hardware processor.

Main memory may be a random-access memory (RAM) or other dynamic storage device. It may be coupled to a communications bus, and used for storing information and software instructions to be executed by a processor. Main memory may also be used for storing temporary variables or other intermediate information during execution of software instructions to be executed by processor 804.

General Considerations

Although some of various drawings may illustrate a number of logical stages in a particular order, stages that are not order dependent may be reordered and other stages may be combined or broken out. While some reordering or other groupings may be specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described regarding specific embodiments. However, the illustrative embodiments above are not intended to be exhaustive or to limit the scope of the claims to the precise forms disclosed. Many modifications and variations are possible in view of the above teachings. The embodiments were chosen to best explain the principles underlying the claims and their practical applications, to thereby enable others skilled in the art to best use the embodiments with various modifications as are suited to the uses contemplated.

In the foregoing specification, embodiments of the approach have been described with reference to numerous specific details that may vary from implementation to implementation. The specification and drawings are, accordingly, to be regarded in an illustrative rather than a restrictive sense. The sole and exclusive indicator of the scope of the approach, and what is intended by the applicants to be the scope of the approach, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used herein the terms "include" and "comprise" (and variations of those terms, such as "including," "includes," "comprising," "comprises," "comprised" and the like) are intended to be inclusive and are not intended to exclude further features, components, integers or steps.

References in this document to "an embodiment," indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to affect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

What is claimed is:

1. A method for a network input-output control system implemented on a host computer to adaptively optimize allocation of network transmission resources to data traffic, the method comprising:

based on, at least in part, default data communications policy, determining one or more default settings for optimizing allocation of one or more network transmission resources to a plurality of data flows;
receiving information about one or more of: events, tasks or actions pertaining to a particular data flow of the plurality of data flows;
based on the information and the default data communications policy, determining that a current bandwidth allocated to the particular data flow needs to be increased to a new bandwidth;
predicting, based on historical throughput data for the plurality of data flows, whether allocating the new bandwidth to the particular data flow causes exceeding a total bandwidth available on a host computer; and
in response to determining that allocating the new bandwidth to the particular data flow causes exceeding the total bandwidth, decreasing at least one second allocation of bandwidth to at least one lower priority data flow, of the plurality of data flows, until allocating the new bandwidth to the particular data flow does not cause exceeding the total bandwidth, and allocating the new bandwidth to the particular data flow.

2. The method of claim 1, further comprising:
determining one or more throughput values for the plurality of data flows;
determining whether a particular throughput value, from the one or more throughput values, that is associated with the particular data flow, from the plurality of data flows, exceeds a particular limit associated with the particular data flow;
if response to determining that the particular throughput value, from the one or more throughput values, that is associated with the particular data flow, from the plurality of data flows, exceeds the particular limit associated with the particular data flow, determining whether the particular limit may be increased; and
in response to determining that the particular limit may be increased, increasing the particular limit by an amount computed based on, at least in part, a particular priority value assigned to the particular data flow.

3. The method of claim 2, further comprising:
in response to determining that the particular limit cannot be increased, determining whether there is a second data flow, in the plurality of data flows, for which a second priority may be decreased;
in response to determining that there is the second data flow, in the plurality of data flows, for which the second priority may be decreased:
decreasing a second limit associated with the second data flow;
increasing the particular limit for the particular data flow;
in response to determining that there is no second data flow, in the plurality of data flows, for which the second priority may be decreased:
determining whether a particular count of shares granted to the particular data flow may be increased; and
in response to determining that the particular count of shares granted to the particular data flow may be increased:
granting one or more additional shares to the particular data flow; and
if there is another data flow in the plurality of data flows, reducing another count of shares granted to another data flow by the one or more additional shares.

4. The method of claim 3, further comprising:
in response to determining that the particular throughput value, from the one or more throughput values, that is associated with the particular data flow, from the plurality of data flows, does not exceed the particular limit associated with the particular data flow, determining whether there is other data flow, from the plurality of data flows, for which other throughput value exceeds other limit associated with the other data flow.

5. The method of claim 1, wherein the plurality of data flows include one or more of: management data traffic, live migration traffic, high availability (HA) traffic, fault tolerance (FT) traffic, vSAN traffic, iSCSI traffic, NFS traffic, vSphere Data Protection Backup traffic, vSphere replication (VR) traffic, VDP traffic, or virtual machine traffic.

6. The method of claim 1, wherein the information includes one or more of: priorities, counts of shares, transmission resources reservations, or limits on amounts of transmission resources; and wherein the network transmission resources include one or more of: network bandwidth, a priority, a share, a minimum bandwidth limit, a maximum bandwidth limit, or a default bandwidth limit.

7. The method of claim 1, further comprising:
receiving, at a control agent, the default data communications policy from a network virtualization security platform implemented in a centralized management plane;
receiving, at the control agent, the information from a control daemon;
based on, at least in part, the default data communications policy and the information, determining one or more new settings for allocating at least one of the one or more network transmission resources to at least one data flow of the plurality of data flows;
transmitting the one or more new settings to a switch to cause the switch to implement the one or more new settings for allocating the at least one of the one or more network transmission resources to the at least one data flow of the plurality of data flows; and
updating the default data communications policy based on the one or more new settings.

8. One or more non-transitory computer-readable storage media storing one or more computer instructions which, when executed by one or more processors, cause the one or more processors to perform:
based on, at least in part, default data communications policy, determining one or more default settings for optimizing allocation of one or more network transmission resources to a plurality of data flows;
receiving information about one or more of: events, tasks or actions pertaining to a particular data flow of the plurality of data flows;
based on the information and the default data communications policy, determining that a current bandwidth allocated to the particular data flow needs to be increased to a new bandwidth;
predicting, based on historical throughput data for the plurality of data flows, whether allocating the new bandwidth to the particular data flow causes exceeding a total bandwidth available on a host computer; and
in response to determining that allocating the new bandwidth to the particular data flow causes exceeding the total bandwidth, decreasing at least one second allocation of bandwidth to at least one lower priority data flow, of the plurality of data flows, until allocating the new bandwidth to the particular data flow does not cause exceeding the total bandwidth, and allocating the new bandwidth to the particular data flow.

9. The one or more non-transitory computer-readable storage media of claim 8, storing additional instructions which, when executed by the one or more processors, cause the one or more processors to perform:
   determining one or more throughput values for the plurality of data flows;
   determining whether a particular throughput value, from the one or more throughput values, that is associated with the particular data flow, from the plurality of data flows, exceeds a particular limit associated with the particular data flow;
   if response to determining that the particular throughput value, from the one or more throughput values, that is associated with the particular data flow, from the plurality of data flows, exceeds the particular limit associated with the particular data flow, determining whether the particular limit may be increased; and
   in response to determining that the particular limit may be increased, increasing the particular limit by an amount computed based on, at least in part, a particular priority value assigned to the particular data flow.

10. The one or more non-transitory computer-readable storage media of claim 9, storing additional instructions which, when executed by the one or more processors, cause the one or more processors to perform:
   in response to determining that the particular limit cannot be increased, determining whether there is a second data flow, in the plurality of data flows, for which a second priority may be decreased;
   in response to determining that there is the second data flow, in the plurality of data flows, for which the second priority may be decreased:
      decreasing a second limit associated with the second data flow;
      increasing the particular limit for the particular data flow;
   in response to determining that there is no second data flow, in the plurality of data flows, for which the second priority may be decreased:
      determining whether a particular count of shares granted to the particular data flow may be increased; and
      in response to determining that the particular count of shares granted to the particular data flow may be increased:
         granting one or more additional shares to the particular data flow; and
         if there is another data flow in the plurality of data flows, reducing another count of shares granted to another data flow by the one or more additional shares.

11. The one or more non-transitory computer-readable storage media of claim 10, storing additional instructions which, when executed by the one or more processors, cause the one or more processors to perform:
   in response to determining that the particular throughput value, from the one or more throughput values, that is associated with the particular data flow, from the plurality of data flows, does not exceed the particular limit associated with the particular data flow, determining whether there is other data flow, from the plurality of data flows, for which other throughput value exceeds other limit associated with the other data flow.

12. The one or more non-transitory computer-readable storage media of claim 8, wherein the plurality of data flows include one or more of: management data traffic, live migration traffic, high availability (HA) traffic, fault tolerance (FT) traffic, vSAN traffic, iSCSI traffic, NFS traffic, vSphere Data Protection Backup traffic, vSphere replication (VR) traffic, VDP traffic, or virtual machine traffic.

13. The one or more non-transitory computer-readable storage media of claim 8, wherein the information includes one or more of: priorities, counts of shares, transmission resources reservations, or limits on amounts of transmission resources; and wherein the network transmission resources include one or more of: network bandwidth, a priority, a share, a minimum bandwidth limit, a maximum bandwidth limit, or a default bandwidth limit.

14. The one or more non-transitory computer-readable storage media of claim 8, storing additional instructions which, when executed by the one or more processors, cause the one or more processors to perform:
   receiving, at a control agent, the default data communications policy from a network virtualization security platform implemented in a centralized management plane;
   receiving, at the control agent, the information from a control daemon;
   based on, at least in part, the default data communications policy and the information, determining one or more new settings for allocating at least one of the one or more network transmission resources to at least one data flow of the plurality of data flows;
   transmitting the one or more new settings to a switch to cause the switch to implement the one or more new settings for allocating the at least one of the one or more network transmission resources to the at least one data flow of the plurality of data flows; and
   updating the default data communications policy based on the one or more new settings.

15. A hypervisor implemented in a host computer and configured to adaptively optimize allocation of network transmission resources to data traffic, the hypervisor comprising:
   one or more processors;
   one or more memory units; and
   one or more non-transitory computer-readable storage media storing one or more computer instructions which, when executed by the one or more processors, cause the one or more processors to perform:
   based on, at least in part, default data communications policy, determining one or more default settings for optimizing allocation of one or more network transmission resources to a plurality of data flows;
   receiving information about one or more of: events, tasks or actions pertaining to a particular data flow of the plurality of data flows;
   based on the information and the default data communications policy, determining that a current bandwidth allocated to the particular data flow needs to be increased to a new bandwidth;
   predicting, based on historical throughput data for the plurality of data flows, whether allocating the new bandwidth to the particular data flow causes exceeding a total bandwidth available on a host computer; and
   in response to determining that allocating the new bandwidth to the particular data flow causes exceeding the total bandwidth, decreasing at least one second allocation of bandwidth to at least one lower priority data flow, of the plurality of data flows, until allocating the new bandwidth to the particular data flow does not cause exceeding the total bandwidth, and allocating the new bandwidth to the particular data flow.

16. The hypervisor of claim 15, wherein the one or more non-transitory computer-readable storage media stores additional instructions which, when executed by the one or more processors, cause the one or more processors to perform:
determining one or more throughput values for the plurality of data flows;
determining whether a particular throughput value, from the one or more throughput values, that is associated with the particular data flow, from the plurality of data flows, exceeds a particular limit associated with the particular data flow;
if response to determining that the particular throughput value, from the one or more throughput values, that is associated with the particular data flow, from the plurality of data flows, exceeds the particular limit associated with the particular data flow, determining whether the particular limit may be increased; and
in response to determining that the particular limit may be increased, increasing the particular limit by an amount computed based on, at least in part, a particular priority value assigned to the particular data flow.

17. The hypervisor of claim 16, wherein the one or more non-transitory computer-readable storage media stores additional instructions which, when executed by the one or more processors, cause the one or more processors to perform:
in response to determining that the particular limit cannot be increased, determining whether there is a second data flow, in the plurality of data flows, for which a second priority may be decreased;
in response to determining that there is the second data flow, in the plurality of data flows, for which the second priority may be decreased;
decreasing a second limit associated with the second data flow;
increasing the particular limit for the particular data flow;
in response to determining that there is no second data flow, in the plurality of data flows, for which the second priority may be decreased:
determining whether a particular count of shares granted to the particular data flow may be increased; and
in response to determining that the particular count of shares granted to the particular data flow may be increased:
granting one or more additional shares to the particular data flow; and
if there is another data flow in the plurality of data flows, reducing another count of shares granted to another data flow by the one or more additional shares.

18. The hypervisor of claim 17, wherein the one or more non-transitory computer-readable storage media stores additional instructions which, when executed by the one or more processors, cause the one or more processors to perform:
in response to determining that the particular throughput value, from the one or more throughput values, that is associated with the particular data flow, from the plurality of data flows, does not exceed the particular limit associated with the particular data flow, determining whether there is other data flow, from the plurality of data flows, for which other throughput value exceeds other limit associated with the other data flow.

19. The hypervisor of claim 15, wherein the plurality of data flows include one or more of: management data traffic, live migration traffic, high availability (HA) traffic, fault tolerance (FT) traffic, vSAN traffic, iSCSI traffic, NFS traffic, vSphere Data Protection Backup traffic, vSphere replication (VR) traffic, VDP traffic, or virtual machine traffic.

20. The hypervisor of claim 15, wherein the one or more non-transitory computer-readable storage media stores additional instructions which, when executed by the one or more processors, cause the one or more processors to perform:
receiving, at a control agent, the default data communications policy from a network virtualization security platform implemented in a centralized management plane;
receiving, at the control agent, the information from a control daemon;
based on, at least in part, the default data communications policy and the information, determining one or more new settings for allocating at least one of the one or more network transmission resources to at least one data flow of the plurality of data flows;
transmitting the one or more new settings to a switch to cause the switch to implement the one or more new settings for allocating the at least one of the one or more network transmission resources to the at least one data flow of the plurality of data flows; and
updating the default data communications policy based on the one or more new settings.

* * * * *